(12) United States Patent
Behnke et al.

(10) Patent No.: US 7,182,832 B2
(45) Date of Patent: Feb. 27, 2007

(54) ADHESIVE PRECOATED HEADLINER MATERIALS

(75) Inventors: Michael Behnke, Ebersberg (DE); Bernd Glunk, Ebersberg (DE)

(73) Assignee: Lear Corporation, Southfield, MI (US)

( * ) Notice: Subject to any disclaimer, the term of this patent is extended or adjusted under 35 U.S.C. 154(b) by 248 days.

(21) Appl. No.: 10/434,929

(22) Filed: May 9, 2003

(65) Prior Publication Data

US 2004/0224595 A1    Nov. 11, 2004

(51) Int. Cl.
*C09J 5/06* (2006.01)

(52) U.S. Cl. .................. 156/320; 156/324; 52/717.04; 296/214

(58) Field of Classification Search ................ 156/290, 156/291, 320, 324; 52/716.5, 717.04, 717.05; 296/214
See application file for complete search history.

(56) References Cited

U.S. PATENT DOCUMENTS

| | | | |
|---|---|---|---|
| 4,812,186 A * | 3/1989 | McConnell et al. .......... 156/90 |
| 5,007,976 A * | 4/1991 | Satterfield et al. .......... 156/222 |
| 5,736,082 A | 4/1998 | Funato et al. |
| 5,837,172 A | 11/1998 | Pritchard et al. |
| 5,840,224 A | 11/1998 | Thary |
| 5,845,458 A | 12/1998 | Patel |
| 5,976,646 A * | 11/1999 | Stevens et al. ................ 428/31 |
| 5,989,699 A | 11/1999 | Kuczynski et al. |
| 6,322,658 B1 * | 11/2001 | Byma et al. ............. 156/309.9 |
| 6,371,832 B1 * | 4/2002 | Raguse ........................ 451/28 |
| 6,451,232 B2 | 9/2002 | Barber et al. |
| 6,852,259 B2 * | 2/2005 | Michael ...................... 264/118 |
| 2001/0001687 A1 | 5/2001 | Pokorzynski et al. |
| 2001/0042935 A1 | 11/2001 | Barber et al. |
| 2003/0100232 A1 * | 5/2003 | Kocher et al. ................ 442/32 |

* cited by examiner

*Primary Examiner*—Jeff H. Aftergut
*Assistant Examiner*—John L. Goff
(74) *Attorney, Agent, or Firm*—Brooks Kushman P.C.

(57) ABSTRACT

The present invention provides a method of making a headliner for use in an automobile interior. The method of the invention comprises applying an adhesive on a first fiber mat and a second fiber mat to form a first adhesive-containing fiber mat and a second adhesive-containing fiber mat. The first adhesive-containing fiber mat and the second adhesive-containing fiber mat are optionally dried. A multilayered structure is then assembled by positioning the first adhesive-containing fiber mat between a first fabric layer and a padding layer and the second adhesive-containing fiber mat between the padding layer and a second fabric. Finally, the multilayered structure is pressed at a sufficiently high temperature to adhere the component layers of the headliner together. The invention also provides a variation in which the fiber mats are formed using the adhesive as a binder. Finally, the invention also provide a headliner made by the method of the invention.

20 Claims, 1 Drawing Sheet

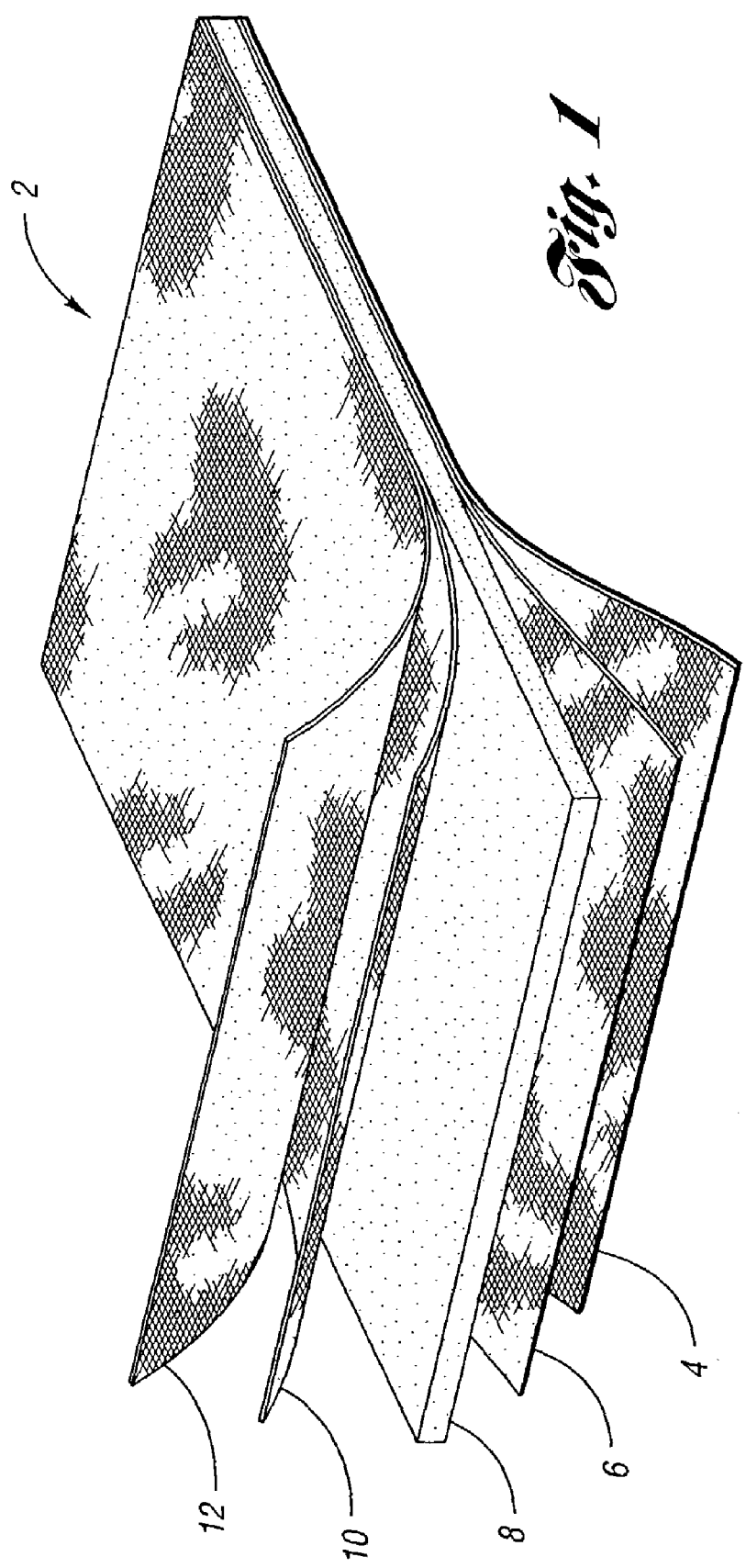

ADHESIVE PRECOATED HEADLINER MATERIALS

BACKGROUND OF THE INVENTION

1. Field of the Invention

The present invention generally relates to a method of making headliners used in a motor vehicle and, more particularly, to methods of making headliners that use adhesives to adhere the headliner layers together.

2. Background Art

As for all automotive components, improved methods of manufacturing that produce higher quality parts at lower costs are always desirable. The aesthetic demands of vehicle interiors makes improvements for such components particularly important. Such components include headliners, trim, upholstery, and the like. Headliners are particularly important because vehicle interiors have significant areas covered by this component.

In the typical headliner forming operation, a PU prepolymer is roller coated onto a PU foam mat. Water is then sprayed on both surfaces of the PU foam mat. A sandwich structure of a non-woven polyester, glass fiber mat, the adhesive-coated PU foam, a second glass fiber mat, and a non-woven polyester with polyethylene film is positioned in a pressing tool. The sandwich structure is heated to about 130° C. with a pressing time of about 30 seconds to form the finished headliner. In order to remove the headliner from the pressing tool, it is necessary to spray a release agent onto the tool before pressing. The use of release agents results in residues on both sides of the headliner after pressing. In a related refinement of this process, a textile is laminated onto the side that faces the car interior and small parts such as cables or retainers are glued to the side facing the car roof. The existing release agents impair bonding in both these instances The adhesives used in the current processes also cause various problems. For example, foaming of the adhesive during reaction occurs causing it to partially bleed through and sticks to the tools which are typically aluminum or steel. Finally, the polyethylene film on the polyester non-woven material melts in areas of high pressure thereby sticking to the tooling as well.

Accordingly, there exists a need in the prior art for an improved process of forming headliners to be used in motor vehicle interiors.

SUMMARY OF THE INVENTION

The present invention overcomes the problems in the prior art by providing in part an improved process for making headliners. The method of the invention comprises applying an adhesive on a first fiber mat and a second fiber mat to form a first adhesive-containing fiber mat and a second adhesive-containing fiber mat. The first adhesive-containing fiber mat and the second adhesive-containing fiber mat are optionally dried. A multilayered structure is then assembled by positioning the first adhesive-containing fiber mat between a first fabric layer and a padding layer and the second adhesive-containing fiber mat between the padding layer and a second non-woven polyester. Finally, the multilayered structure is pressed at a sufficiently high temperature to adhere the component layers of the headliner together. In a variation of the method of the invention, the fiber mats are formed using the adhesive as a binder. The methods of the invention avoid leakage and bleed-through of the adhesive. Moreover the present invention simplifies the manufacturing of headliners thereby achieving cost and energy savings. Finally, the methods of the present invention use adhesives that are less hazardous than those currently used.

In another embodiment of the present invention, a headliner made by the methods of the invention is provided. The headliner of the invention comprises a first fabric layer; a first adhesive-containing fiber mat disposed over the first fabric layer; a padding layer disposed over the first adhesive-containing fiber mat; a second adhesive-containing fiber mat disposed over the padding layer; and a second fabric layer disposed over the second adhesive-containing fiber mat.

BRIEF DESCRIPTION OF THE DRAWINGS

FIG. 1 is a schematic of the multilayered headliner of the present invention with a section in which the constituent layers have been peeled away.

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

In an embodiment of the present invention, a method of making a headliner for motor vehicle interiors is provided. With reference to FIG. 1, a schematic of the multilayered headliner made by the method of the present invention with a section in which the constituent layers have been peeled away is provided. Headliner 2 comprises a first fabric layer 4 over which a first adhesive-containing fiber mat 6 is disposed. Similarly, padding layer 8 is disposed over first adhesive-containing fiber mat 6 and second adhesive-containing fiber mat 10 is disposed over padding layer 8. Preferred padding layers are foam or sponge-like layers. Foam polyurethane layers are particularly useful for this layer. Finally, second fabric layer 12 is disposed over second adhesive-containing fiber mat 10. Both the first fabric layer and the second fabric layer comprise either woven or non-woven fabrics. More preferably, the first and second fabric layers comprise non-woven fabrics, and most preferably, the first and second fabric layers comprise non-woven polyester. Optionally, one or both of the first fabric layer or the second fabric layer are coated with a polyethylene film.

The method of the invention comprises applying an adhesive to a first fiber mat and a second fiber mat to form a first adhesive-containing fiber mat and a second adhesive-containing fiber mat. The adhesive will characteristically have protected reactive groups. As used herein, protective reactive groups means that the adhesive will remain usable after exposure to ambient conditions for an extended period of time. Preferably, this extended period of time will be at least a month. More preferably, this extended time will be at least 3 months, and most preferably, this extended time will be at least 6 months. Moreover, the first adhesive-containing mat and the second adhesive-containing fiber mat each independently comprise fibers and a binder. The preferred fibers are glass fibers. The first adhesive-containing fiber mat and the second adhesive-containing fiber mat are next heated. This heating step will be performed at a sufficient temperature to either dry or sinter the adhesive to the first and second fiber mats. However, this temperature must not be so high that the adhesive is completely cured or significantly cross-linked. As used herein, the adhesive is significantly cross-linked when it cannot be reactivated upon heating and adhered to a substrate. Typically, this temperature will be less than 100° C. Preferably, the temperature is from about 50° C. to about 80° C. A multilayered structure is then assembled by positioning the first adhesive-containing fiber mat between a first fabric layer and a padding layer and the second adhesive-containing fiber mat between the padding layer and a second fabric layer. Accordingly, the first adhesive-containing fiber mat is disposed over the first fabric layer, the padding layer is disposed over the first adhesive-containing fiber mat, the second adhesive-containing fiber mat is disposed over the padding layer, and the second fabric layer is disposed over the second adhesive-containing fiber mat. Finally, the multilayered structure is pressed at a sufficiently high temperature to adhere the first fabric layer, the first adhesive-containing fiber mat, the padding layer, the second adhesive-containing fiber mat, and the second fabric layer together. Preferably, the temperature at which the multilayered structure is pressed will be at least 100° C. More preferably, the temperature at which the multilayered structure is pressed will be from about 110° C. to about 150° C.

Preferably the adhesive with protected active groups comprise a self cross-linking polyurethane or a reactive epoxy adhesive. A preferred adhesive is a self cross-linking single component polyurethane-dispersion adhesive with a surface deactivated isocyanate hardener enclosed. In another variation, the adhesive is a self cross-linking single component polyurethane-hotmelt adhesive with an encapsulated isocyanate hardener in it. The preferred adhesives are further characterized by not foaming during the heated pressing of the headliner and the subsequent cross-linking of the glue because the amount of generated carbon dioxide is small. Accordingly, bleed-through and glue leakage does not occur. Moreover, the amount of releasing agents used to form the headliner is greatly reduced. Suitable adhesives include but are not limited to Terokal 9031 commercially available from Henkel Teroson GmbH located in Heidelberg Germany and Purbond HCM 555 commercially available from Collano AG located in Switzerland. Typically, the amount of adhesive will be from about 100 g per square meter of fiber mat to about 200 g per square meter of mat. When the adhesive is applied to each side of an already bound mat, the amount of adhesive applied to each side will be about 50 g per square meter of mat to about 100 g per square meter of mat.

The first adhesive-containing mat and the second adhesive-containing mat used to form the headliner of the present invention may be formed by a number of processes. Each process will typically produce adhesive-containing mats that can be stored for up to six months. Storage will often be accomplished by winding the mats onto rolls. In one variation, an adhesive-containing mat is formed by applying the adhesives set forth above to both surfaces of a fiber mat. The adhesive may be applied to the fiber mats by such processes as pouring, spraying, and the like. The preferred fiber mat is a glass fiber mat. If a self cross-linking one component polyurethane dispersion such as Terokal 9031 is used as the adhesive, the adhesive is typically either sprayed or poured onto both sides of the fiber mats. The adhesive coated mats are then heated in a drying oven until the water is evaporated. Typically the temperature for drying is from about 40–50° C. The resulting adhesive-containing mat will typically pass through a series of rollers and cut to predetermined dimensions. If the dispersion is applied onto an already bound glass fiber mat a roller coater is a preferred type of coater. When a self cross-linking one component polyurethane-hotmelt adhesive such as Purbond HCM 555 is used as the adhesive, the adhesive may be applied by scattering, and the temperature to sinter the adhesive will typically be from about 60–65° C.

In a variation, the adhesive can be used as a binder for the fiber mats. In this variation, a self cross-linking one component polyurethane dispersion such as Terokal 9031 may be used as the adhesive. This dispersion is poured or sprayed onto glass fibers by any suitable applicator as known to one skilled in the art. The combination of adhesive and fibers are heated in a drying oven at a temperature about 40–50° C. until all the water is evaporated. The resulting adhesive-containing mat will typically pass through a series of rollers and cut to predetermined dimensions. When a self cross-linking one component polyurethane-hotmelt adhesive such as Purbond HCM 555 is used as the binder (and adhesive), an adhesive-containing fiber mat is formed by scattering the hotmelt with a scattering applicator onto glass fibers. Similarly, this combination of adhesive and fibers is heated in a drying oven at a temperature about 60–65° C. until the adhesive starts to melt and sticks to the fibers.

In a particularly preferred embodiment, a method of the present invention comprises applying an adhesive on a first glass fiber mat and a second glass fiber mat to form a first adhesive-containing glass fiber mat and a second adhesive-containing glass fiber mat. As set forth above, the adhesive will characteristically have protected reactive groups. The first adhesive-containing glass fiber mat and the second adhesive-containing glass fiber mat are next heated. This heating step will be performed at a sufficient temperature to either dry or sinter the adhesive to the first and second glass fiber mats. However, this temperature must not be so high that the adhesive is completely cured or significantly cross-linked. Again as set forth above, this temperature will typically be less than 100° C. Preferably, the temperature is from about 50° C. to about 80° C. A multilayered structure is then assembled by positioning the first adhesive-containing fiber mat between a first non-woven polyester layer and a foam polyurethane layer and the second adhesive-containing fiber mat between the foam polyurethane layer and a second non-woven polyester. Accordingly, the first adhesive-containing fiber mat is disposed over the first non-woven polyester layer, the foam polyurethane layer is disposed over the first adhesive-containing fiber mat, the second adhesive-containing fiber mat is disposed over the foam polyurethane layer, and the second non-woven polyester layer is disposed over the second adhesive-containing fiber mat. Finally, the multilayered structure is heated at a sufficiently high temperature, the first non-woven polyester layer, the first adhesive-containing fiber mat, the foam polyurethane layer, the second adhesive-containing fiber mat, and the second non-woven polyester layer together. Preferably, the temperature at which the multilayered structure is pressed will be at least 100° C. More preferably, the temperature at which the multilayered structure is pressed will be from about 110° C. to about 150° C.

In another embodiment of the present invention, a headliner made by the methods of the invention is provided. The headliner of the invention comprises a first fabric layer, a first adhesive-containing fiber mat disposed over the first fabric layer, a padding layer disposed over the first adhesive-containing fiber mat, a second adhesive-containing fiber mat disposed over the padding layer, and a second fabric layer disposed over the second adhesive-containing fiber mat. Although many types of fiber mats may be utilized in forming the headliners of the present invention, the most preferred headliners are made by the method comprising applying an adhesive on a first glass fiber mat and a second glass fiber mat to form a first adhesive-containing glass fiber mat and a second adhesive-containing glass fiber mat. As set forth above, the adhesive will characteristically have protected reactive groups. The first adhesive-containing glass fiber mat and the second adhesive-containing glass fiber mat are next heated. This heating step will be performed at a sufficient temperature to dry or sinter the adhesive to the first and second glass fiber mats. However, this temperature must not be so high that the adhesive is completely cured or significantly cross-linked. Typically, this temperature will be less than 100° C. Preferably, the temperature is from about 50° C. to about 80° C. A multilayered structure is then assembled by positioning the first adhesive-containing fiber mat between a first fabric layer and a padding layer (as described above) and the second adhesive-containing fiber mat between the padding layer and a second fabric. Accordingly, the first adhesive-containing fiber mat is disposed over the first fabric layer, the padding layer is disposed over the first adhesive-containing fiber mat, the second adhesive-containing fiber mat is disposed over the padding layer, and the second fabric layer is disposed over the second adhesive-containing fiber mat. Again, as described above, the first and second fabric layers may include woven or non-woven fabrics with non-woven fabrics such as a non-woven polyester being preferred. Finally, the multilayered structure is heated at a sufficiently high temperature the first fabric layer, the first adhesive-containing fiber mat, the padding layer, the second adhesive-containing fiber mat, and the second fabric layer together. Preferably, the temperature at which the multilayered structure is pressed will be at least 100° C. More preferably, the temperature at which the multilayered structure is pressed will be from about 110° C. to about 150° C.

In yet another embodiment of the present invention, a method of making a headliner using an adhesive-containing padding layer is provided. The method of this embodiment comprises applying an adhesive to a padding layer to form an adhesive-containing padding layer. Typically, the adhesive is applied to each side of the padding layer in an amount from about 50 g per square meter of padding layer to about 100 g per square meter of padding layer. Suitable methods of applying the adhesive include pouring and spraying. The padding layer and the adhesive will have the same properties as described above. The adhesive-containing padding layer is next heated. This heating step will be performed at a sufficient temperature to either dry or sinter the adhesive to the padding layer. However, this temperature must not be so high that the adhesive is completely cured or significantly cross-linked. Typically, this temperature will be less than 100° C. Preferably, the temperature is from about 50° C. to about 80° C. A multilayered structure is then assembled by positioning a first fiber mat between a first fabric layer and the padding layer and a second fiber mat between the padding layer and a second fabric layer. The first and second fiber mats are as described above and each comprises fibers and a binder with glass fibers being preferred. The first and second fabric layers are also as described above. Accordingly, the first fiber mat is disposed over the first fabric layer, the adhesive-containing padding layer is disposed over the fiber mat, the second fiber mat is disposed over the adhesive-containing padding layer, and the second fabric layer is disposed over the second fiber mat. Finally, the multilayered structure is pressed at a sufficiently high temperature to adhere the first fabric layer, the first fiber mat, the padding layer, the second fiber mat, and the second fabric layer together. Preferably, the temperature at which the multilayered structure is pressed will be at least 100° C. More preferably, the temperature at which the multilayered structure is pressed will be from about 110° C. to about 150° C. Optionally, standard adhesive may be applied between the first fiber mat and the first fabric layer and between the second fiber mat and the second fabric layer prior to pressing.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of making a headliner for motor vehicle interiors, the method comprising:
    a) applying an adhesive to a first fiber mat and a second fiber mat to form a first adhesive-containing fiber mat and a second adhesive-containing fiber mat wherein the adhesive has protected reactive groups and the first adhesive-containing fiber mat and the second adhesive-containing fiber mat each independently comprise fibers, a binder, and the adhesive;
    b) heating the first adhesive-containing fiber mat and the second adhesive-containing fiber mat;
    c) assembling a multilayered structure that has the first adhesive-containing fiber mat positioned between a first fabric layer and a padding layer, and the second adhesive-containing fiber mat positioned between the padding layer and a second fabric layer wherein;
    the first fabric layer and the second fabric layer each independently include a fabric selected from woven fabrics or non-woven fabrics;
    the first adhesive-containing fiber mat is disposed over the first fabric layer;
    the padding layer is disposed over the first adhesive-containing fiber mat;
    the second adhesive-containing fiber mat is disposed over the padding layer; and
    the second fabric layer is disposed over the second adhesive-containing fiber mat; and
    d) pressing and heating the multilayered structure at a sufficient temperature to adhere the first fabric layer, the first adhesive-containing fiber mat, the padding layer, the second adhesive-containing fiber mat, and the second fabric layer together, wherein step b) is performed before step c and step d).

2. The method of claim 1 wherein the first fabric layer and the second fabric layer each independently include a non-woven fabric.

3. The method of claim 1 wherein one or both of the first fabric layer or second fabric layer are coated with a polyethylene film.

4. The method of claim 1 wherein the padding layer is a foam polyurethane layer.

5. The method of claim 1 wherein the fiber mat is a glass fiber mat.

6. The method of claim 1 wherein the adhesive is applied to each side of the fiber mat in an amount from about 50 g per square meter of mat to about 100 g per square meter of mat.

7. The method of claim 1 wherein the first adhesive-containing fiber mat and the second adhesive-containing fiber mat are heated in step b to a temperature of about 50° C. to about 80° C.

8. The method of claim 1 wherein the adhesive comprises a self cross-linking polyurethane or a reactive epoxy adhesive.

9. The method of claim 8 wherein the adhesive comprises a self cross-linking single component polyurethane-dispersion adhesive with a surface deactivated isocyanate hardener enclosed.

10. The method of claim 8 wherein the adhesive comprises a self cross-linking single component polyurethane hot melt adhesive with an encapsulated isocyanate hardener.

11. The method of claim 1 wherein the step of pressing is performed at a temperature of at least 100° C.

12. The method of claim 1 wherein the step of pressing is done at a temperature from about 110° C. to about 150° C.

13. A method of making a headliner for motor vehicle interiors, the method comprising:
 a) forming both a first glass fiber-containing mat and a second glass fiber-containing mat by combining glass fibers with an adhesive having protected reactive groups;
 b) heating the first adhesive-containing glass fiber mat and the second adhesive-containing glass fiber mat;
 c) assembling a multilayered structure that has the first adhesive-containing glass fiber mat positioned between a first non-woven polyester layer and a foam polyurethane layer, and the second adhesive-containing glass fiber mat positioned between the foam polyurethane layer and a second non-woven polyester layer wherein:
 the first adhesive-containing glass fiber mat is disposed over the first non-woven polyester layer;
 the foam polyurethane layer is disposed over the first adhesive-containing glass fiber mat;
 the second adhesive-containing glass fiber mat is disposed over the foam polyurethane layer; and
 the second non-woven polyester layer is disposed over the second adhesive-containing glass fiber mat; and
 d) heating the multilayered structure at a sufficient temperature to adhere the first non-woven polyester layer, the first adhesive-containing glass fiber mat, the foam polyurethane layer, the second adhesive-containing glass fiber, and the second non-woven polyester layer together, wherein step b) is performed before step c and step d).

14. The method of claim 13 wherein the one or both of the first non-woven polyester layer or second non-woven polyester layer are coated with a polyethylene film.

15. The method of claim 13 wherein the adhesive is present in an amount from about 100 g per square meter of mat to about 200 g per square meter of mat.

16. The method of claim 13 wherein the first adhesive-containing glass fiber mat and the second adhesive-containing glass fiber mat are dried by heating.

17. The method of claim 13 wherein the adhesive comprises a self cross-linking polyurethane or a reactive epoxy adhesive.

18. The method of claim 17 wherein the adhesive comprises a self cross-linking single component polyurethane-dispersion adhesive with a surface deactivated isocyanate hardener enclosed or a self cross-linking single component polyurethane hot melt adhesive with an encapsulated isocyanate hardener.

19. The method of claim 13 wherein the step of pressing is performed at a temperature of at least 100° C.

20. A method of making a headliner for motor vehicle interiors, the method comprising:
 a) applying an adhesive to a first fiber mat and a second fiber mat to form a first adhesive-containing fiber mat and a second adhesive-containing fiber mat wherein the adhesive has protected reactive groups and the first adhesive-containing fiber mat and the second adhesive-containing fiber mat each independently comprise fibers, a binder, and the adhesive;
 b) heating the first adhesive-containing fiber mat and the second adhesive-containing fiber mat;
 c) assembling a multilayered structure consisting of the first adhesive-containing fiber mat positioned between a first fabric layer and a padding layer such that the first adhesive-containing fiber mat contacts the first fabric layer and the padding layer, and the second adhesive-containing fiber mat positioned between the padding layer and a second fabric layer such that the second adhesive-containing fiber mat contacts the second fabric layer and the padding layer wherein;
 the first fabric layer and the second fabric layer each independently include a fabric selected from woven fabrics or non-woven fabrics;
 the first adhesive-containing fiber mat is disposed over the first fabric layer;
 the padding layer is disposed over the first adhesive-containing fiber mat;
 the second adhesive-containing fiber mat is disposed over the padding layer; and
 the second fabric layer is disposed over the second adhesive-containing fiber mat; and
 d) pressing and heating the multilayered structure at a sufficient temperature to adhere the first fabric layer, the first adhesive-containing fiber mat, the padding layer, the second adhesive-containing fiber mat, and the second fabric layer together, wherein step b) is performed before step c and step d).

* * * * *